(12) United States Patent
Huelsen et al.

(10) Patent No.: US 12,240,528 B2
(45) Date of Patent: Mar. 4, 2025

(54) ROOF MODULE FOR FORMING A VEHICLE ROOF

(71) Applicant: Webasto SE, Stockdorf (DE)

(72) Inventors: Michael Huelsen, Stockdorf (DE); Craig T. Marx, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 247 days.

(21) Appl. No.: 17/912,795

(22) PCT Filed: Apr. 6, 2021

(86) PCT No.: PCT/EP2021/058917
§ 371 (c)(1),
(2) Date: Sep. 19, 2022

(87) PCT Pub. No.: WO2021/204786
PCT Pub. Date: Oct. 14, 2021

(65) Prior Publication Data
US 2023/0138674 A1     May 4, 2023

(30) Foreign Application Priority Data

Apr. 6, 2020 (DE) .................. 10 2020 109 505.8

(51) Int. Cl.
*B62D 25/06* (2006.01)
*B60R 11/04* (2006.01)
(Continued)

(52) U.S. Cl.
CPC .............. *B62D 25/06* (2013.01); *B60R 11/04* (2013.01); *B60S 1/023* (2013.01); *B60S 1/52* (2013.01);
(Continued)

(58) Field of Classification Search
CPC ... B62D 25/06; B60R 11/04; B60R 2011/004; B60S 1/023; B60S 1/52; B60S 1/56; G01S 2013/93273
See application file for complete search history.

(56) References Cited

U.S. PATENT DOCUMENTS

2007/0176083 A1  8/2007  Wimmer et al.
2016/0119509 A1  4/2016  Wato
(Continued)

FOREIGN PATENT DOCUMENTS

DE  102015220575 A1  4/2016
DE  102018129839 A1  5/2019
(Continued)

OTHER PUBLICATIONS

Written Opinion of the International Searching Authority for PCT/EP2021/058917 mailed Oct. 6, 2022, in English (7 pages).
(Continued)

*Primary Examiner* — David Z Huang
(74) *Attorney, Agent, or Firm* — Fitch, Even, Tabin & Flannery, LLP

(57) ABSTRACT

A roof module for forming a vehicle roof on a motor vehicle, the roof module may have a panel component whose outer surface at least partially forms the roof skin of the vehicle roof, the roof module having at least one environment sensor configured to send and/or receive electromagnetic signals for detecting the vehicle environment. At least one reflector element at which the electromagnetic signals can be reflected is associated with the environment sensor.

14 Claims, 2 Drawing Sheets

(51) Int. Cl.
  *B60S 1/02*   (2006.01)
  *B60S 1/52*   (2006.01)
  *B60S 1/56*   (2006.01)
  *B60R 11/00*   (2006.01)
  *G01S 13/931*   (2020.01)

(52) U.S. Cl.
  CPC ........... *B60S 1/56* (2013.01); *B60R 2011/004* (2013.01); *G01S 2013/9323* (2020.01); *G01S 2013/93273* (2020.01)

(56) References Cited

U.S. PATENT DOCUMENTS

2016/0297437 A1   10/2016  Hara et al.
2018/0011173 A1*  1/2018  Newman ............... B60S 1/0818
2019/0161125 A1   5/2019  Schmidt

FOREIGN PATENT DOCUMENTS

| EP | 1813474 | A2 | 8/2007 |
|----|---------|----|----|
| EP | 3078987 | A1 | 10/2016 |
| JP | H0930326 | A | 2/1997 |
| JP | 2004276733 | A | 10/2004 |
| JP | 2015107764 | A | 6/2015 |

OTHER PUBLICATIONS

International Search Report for PCT/EP2021/058917 mailed Jul. 20, 2021, in English and German (7 pages).

\* cited by examiner

ROOF MODULE FOR FORMING A VEHICLE ROOF

CROSS-REFERENCE TO RELATED APPLICATION

This application is a U.S. national phase application filed under 35 U.S.C. § 371 of International Application No. PCT/EP2021/058917, filed Apr. 6, 2021, designating the United States, which claims priority from German Patent Application Number 10 2020 109 505.8 filed on Apr. 6, 2020, which are hereby incorporated herein by reference in its entirety for all purposes.

FIELD

The invention relates to a roof module for forming a vehicle roof according to the preamble of claim 1.

BACKGROUND

Roof modules of this kind are known from practice. Such a roof module can be placed on top of a vehicle body, which forms a vehicle body shell, as a separate component. The roof module can be a purely fixed roof element which has a transparent portion for forming a panoramic roof, the transparent portion forming a see-through portion. Alternatively, the roof module can have a roof opening system which comprises a displaceable cover element by means of which a roof opening can be opened or closed at will. Roof modules of this kind always comprise a roof skin, which forms an outer visible surface of the roof module and can be partially transparent to form the see-through portion and which borders the roof opening in the case of a roof module having a roof opening system. The roof module is often permanently attached to the roof side rails of the vehicle body when in the installed position.

Furthermore, it is known for environment sensors to be disposed on the roof modules, the environment sensors enabling the motor vehicle in question to drive autonomously or semi-autonomously. The vehicle environment can be monitored and detected by means of the environment sensors. From the state of the art, sensor modules are known which are placed on top of the vehicle roof since the vehicle roof is typically the highest point of the vehicle, from where the vehicle environment is easily visible. However, the sensor modules configured as on-top attachments lead to a vehicle appearance which typically does not meet customer demands. Another advantage of the sensor modules with the integrated environment sensors which are placed on top of the vehicle roof is that the environment sensors are exposed to the weather conditions at all times in this manner. In particular, this can cause the environment sensors to become covered in ice and therefore to no longer be usable. Also, the sensor modules mounted on top of the vehicle roof are disadvantageous in terms of aerodynamics and the occurrence of undesired wind noise.

SUMMARY

The object of the invention is to provide a new roof module which avoids the disadvantages of the known state of the art described above.

This object is attained by a roof module according to the teaching of claim 1.

Advantageous embodiments of the invention are the subject matter of the depend-ent claims.

The roof module according to the invention is characterized by a reflector element which is associated with the environment sensor and at which the electromagnetic signals can be reflected. In other words, this means that the reflector element deflects the electromagnetic signals, which are sent or received by the environment sensor, at a reflective surface. This deflection of the electromagnetic signals at the reflector element allows the environment sensor to be compactly integrated into the roof module. After all, the environment sensor itself does not require a direct view of the field of view to be observed. Instead, the field of view to be observed is reflected onto the sensor of the environment sensor via the reflector element. The fact that the beam path of the electromagnetic signals is deflected at the reflector element leads to a greater freedom of design in placing the environment sensor in the roof module. In addition, the reflective properties of the reflector element enable the implementation of particular reflection characteristics. For instance, it becomes possible for an enlarged or miniaturized field of view to be reflected onto the sensor of the environment sensor.

Basically any type of reflector element can be employed for reflecting the electromagnetic signals. In view of particular reflection characteristics, it is particularly advantageous for the reflector element to have a reflective surface which is spherically curved in a convex or concave manner. Spherically curved reflective surfaces of this kind allow the field of view to be observed to be highly widened or miniaturized. Also, the focus and the focusing distance can be adapted by means of the reflector element.

A reflective surface portion of a component present anyway, such as the panel component or a frame part, can be used to form the reflector element in order to avoid the introduction of an additional component into the roof module. To this end, the surface portion in question has to exhibit sufficient reflective properties.

The reflective surface portion can be polished, vapor-deposited, and/or coated to increase the reflection.

There are various options for attaching the environment sensor to the vehicle body. The environment sensor is supported in a particularly stable manner if it is indirectly or directly attached to a frame or body shell part of the vehicle roof. The frame part can be a roof frame, for example. The body shell part can be a vehicle frame. In this manner, high precision of reflection when reflecting the electromagnetic signals from the reflector element onto the sensor of the environment sensor is made possible.

There are also various options for attaching the reflector element to the roof module. According to a first alternative, the reflector element can be attached to the panel component of the roof module. A particularly simple way of attaching the reflector element to the panel component is gluing, injecting, screwing or clipping the reflector element to the inner side of the panel component.

According to a second alternative, the reflector element can also be attached to the sensor housing of the environment sensor. In this manner, the reflector element can be preinstalled at the same time as the environment sensor is being installed in its sensor housing and the beam path can be tested in advance.

According to a third alternative, the environment sensor and the reflector element can be attached to a support component together.

It is particularly advantageous for the environment sensor and the reflector element to be disposed in a housing unit in an encapsulated manner to protect the environment sensor and the reflector element from harmful weather conditions.

The housing unit has to have at least one passage element through which the electromagnetic signals can pass and then be reflected at the reflector element.

A major issue in connection with the integration of an environment sensor into a roof module are the conflicting goals of a design as compact as possible on the one hand and a largest possible area of observation of the environment sensor on the other hand. This conflict of goals can be optimized by disposing the reflector element above the passage element in the vertical direction. This makes it possible for the beam path of the environment sensor to be directed upward and then be reflected downward at the reflector element. The reflected beams can exit through the passage element disposed below and cover a large area of observation. In the horizontal direction, the reflector element can be disposed to the side of the passage element to achieve an optimized beam path of the environment sensor. If the passage element is also disposed above the environment sensor at the same time, the resulting beam path allows a particularly compact design of the roof module.

In view of a design of the roof module as compact as possible, it is further particularly advantageous for the environment sensor to be at least partially disposed at the same height as the passage element in the vertical direction. In this manner, the installation space within the roof module can be ideally utilized for the encapsulated accommodation of the environment sensor.

An adjusting device allowing the relative position between the environment sensor and the reflector element to be adjusted can be provided so as to be able to adjust the environment sensor and/or the reflector element relative to each other.

An excessive accumulation of dirt can interfere with or entirely prevent a passage of the electromagnetic signals through the passage element. According to a preferred embodiment, a cleaning device configured to clean the passage element can be provided to avoid this.

Basically any type of cleaning device can be used to clean the passage element. A cleaning device is particularly simple to realize if it comprises a cleaning nozzle configured to discharge a cleaning liquid to clean the surface of the passage element by spraying it with the cleaning liquid, for example.

A reflection of the electromagnetic signals at the reflector element can also be hindered if the surface of the reflector element fogs or becomes covered in ice. According to a preferred embodiment, the reflector element can be heated by means of a heating device to thus dry the reflective surface of the reflector element so as to avoid this. In this case, the heating device may also be used to heat a see-m through element.

Basically and type of environment sensor can interact with the reflector element. Preferably, the environment sensor can be a lidar sensor and/or a radar sensor and/or a camera sensor and/or a multi-camera sensor.

A vehicle which is equipped with the roof sensor module according to the invention and which is an autonomously driving vehicle drives autonomously without at least substantial intervention by a driver when in an autonomous driving mode. In a motor vehicle operated in a semi-autonomous driving mode, the roof module according to the invention can form part of a driver assistance system, for example. In an integrated manner, the roof sensor module (RSM) forms a building part in which components required for autonomous or semi-autonomous driving of the motor vehicle in question are accommodated. The roof module, which can comprise a plurality of functional elements, is a compact structural unit which can be connected to a vehicle body or a vehicle body shell, which comprises roof side rails, between which the roof module is accommodated, by a vehicle manufacturer to form a vehicle roof.

The roof module according to the invention is in particular part of a passenger car, but it can also be employed in a utility vehicle, which can be a delivery van, a small autonomously driving bus-like vehicle, such as what is referred to as a people mover, or a tractor unit, for example. A use of the roof module in a rail-bound or water-bound vehicle is conceivable, as well.

The invention also relates to a motor vehicle which comprises a roof module of the kind described above and which is in particular an autonomously or semi-autonomously driving vehicle. The vehicle can basically be any road-, rail- or water-bound vehicle. However, it is preferably a passenger car or a utility vehicle and can be equipped with an electric drive and/or a combustion engine.

An embodiment of the invention is schematically illustrated in the drawing and will be discussed as an example below.

BRIEF DESCRIPTIONS OF THE DRAWINGS

DETAILED DESCRIPTION

Figure 1:
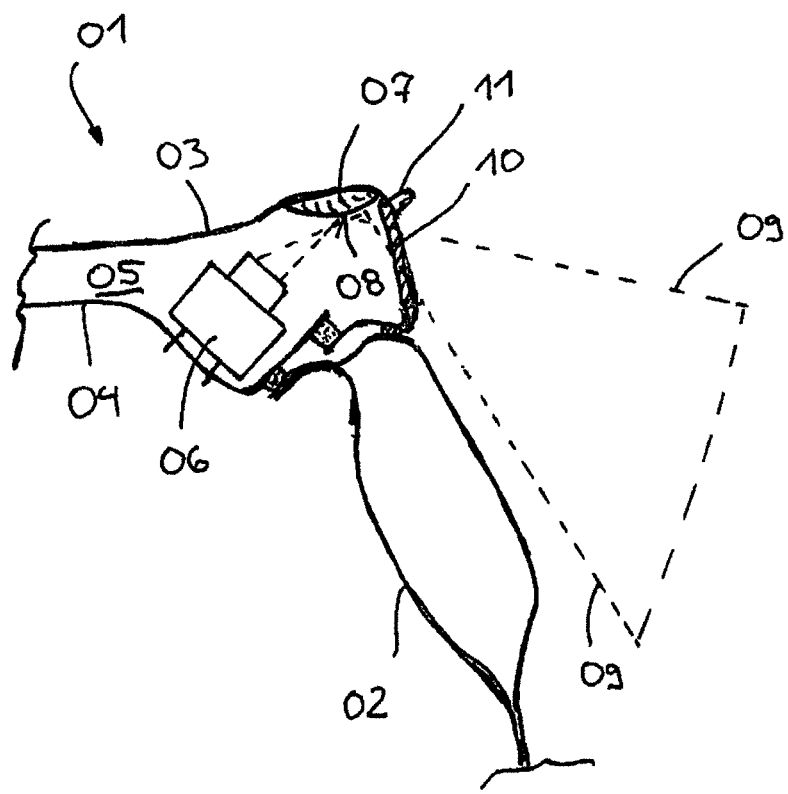
FIG. 1 is a schematic cross section of a roof module having an environment sensor and a reflector element.

FIG. 1 shows a schematic cross section of a roof module 01, only the right side edge of roof module 01 being illustrated in FIG. 1. Roof module 01 is placed on a frame or body shell part 02 of the vehicle roof at the sides and attached there in a suitable manner. A panel component 03, which forms the roof skin, and a roof frame 04 define a cavity 05, in which an environment sensor 06 is installed on each side. A reflector element 07 is associated with each environment sensor 06. Electromagnetic signals 09, such as light beams or radar beams, can be reflected at reflective surface 08 of the reflector element 07, reflective surface 08 being spherically curved in a convex manner. In FIG. 1, electromagnetic signals 09 are indicated only at the borders of the field of view, but reflected electromagnetic signals 09 can of course cover the entire field of view between the borders of the field of view.

Depending on the beam direction, i.e., depending on whether the signals are first emitted by environment sensor 06 or are to be detected by environment sensor 06, electromagnetic signals 09 pass through a passage element 10 prior to or after the reflection and are deflected at reflector element 07 in the process. This allows electromagnetic signals 09 to either be reflected onto the sensor surface of environment sensor 06 or be radiated in the desired direction by the reflector element. This deflection of electromagnetic signals 09 allows environment sensor 06 to be integrated into roof module 01 in a compact manner. At the same time, the field of view directly below the roof module can be observed along the side edge of the vehicle. This allows the immediate vicinity around the vehicle to be covered. Also, an improved 360° view with a smaller blind spot or a smaller blind area can be realized.

A cleaning nozzle 11 by means of which the cleaning liquid can be sprayed onto the outer side of passage element 10 if too much dirt has accumulated thereon is provided for cleaning passage element 10.

Reflector element 07 is glued, injected, screwed or clipped to the inner side of panel component 03 of roof module 01. Additionally, reflector element 07 can be heated by means of a heating device, which is not illustrated separately in FIG. 1. Alternatively, the reflector element can also be produced by vapor-depositing a suitable material having good reflective properties, e.g., by vapor-depositing a metal layer.

Figure 2:
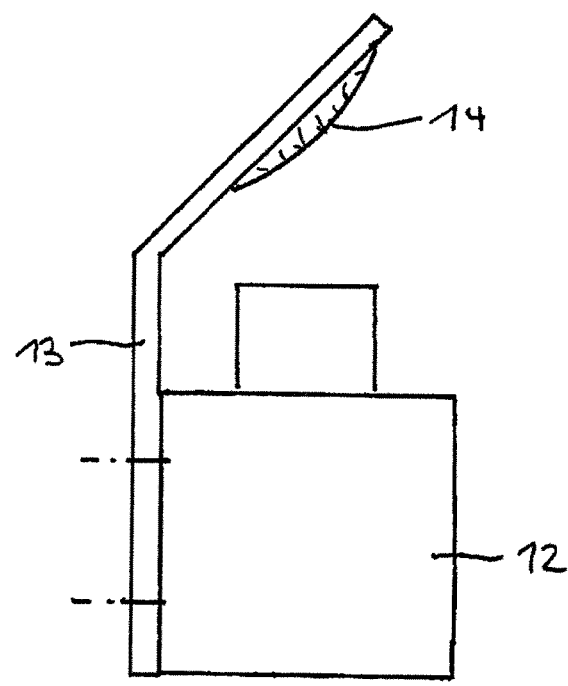
FIG. 2 is a side view of an environment sensor having a reflector element attached to a support component.

FIG. 2 shows an environment sensor 12, to whose side a support component 13 is attached. On the front side of support components 13, opposite the sensor of environment sensor 12, a reflector element 14 is attached, e.g., glued, to support component 13. Attaching reflector element 14 to environment sensor 12 in this manner allows the correct orientation of reflector element 14 relative to environment sensor 12 to be tested prior to the installation in the roof module.

Figure 3:
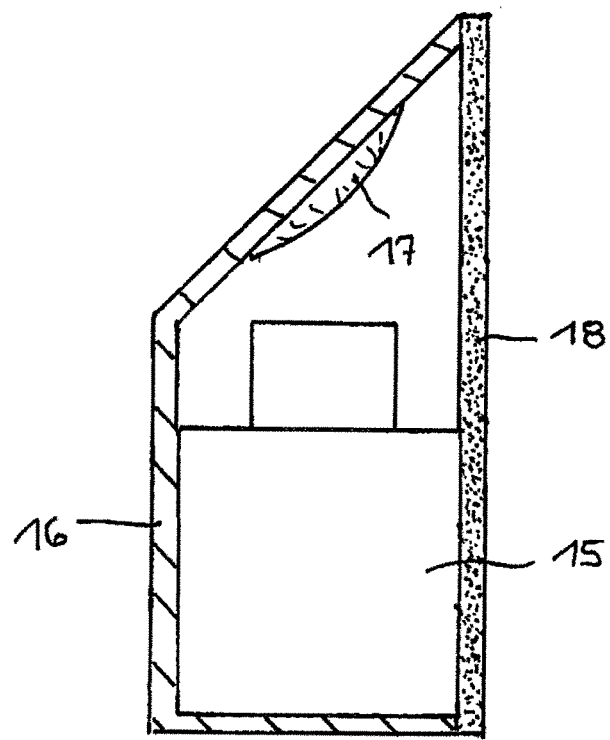
FIG. 3 is a schematic cross section of an environment sensor having a reflector element installed in the sensor housing.

FIG. 3 shows another environment sensor 15, which is installed in a sensor housing 16. A reflector element 17 is attached, e.g., glued, to the inner side of sensor housing 16. Housing wall 18, which is located opposite reflector element 17, is made of a material transparent to electromagnetic signals 09 of environment sensor 15, such as a material transparent to light or transparent to radar beams. In this manner, environment sensor 15 can be accommodated in a capsule-type housing unit together with reflector element 17 in such a manner that they are protected against harmful environmental conditions.

The invention claimed is:

1. A roof module for forming a vehicle roof on a motor vehicle, the roof module comprising:
   a panel component whose outer surface at least partially forms a roof skin of the vehicle roof,
   the roof module comprising at least one environment sensor configured to send and/or receive electromagnetic signals for detecting the vehicle environment,
   wherein at least one reflector element at which the electromagnetic signals can be reflected is associated with the environment sensor, and
   wherein the reflector element is formed by a reflective surface portion of the panel component or of a frame or body shell part of the roof module.

2. The roof module according to claim 1, wherein the reflector element has a reflection surface which is spherically curved in a convex or concave manner.

3. The roof module according to claim 1, wherein the environment sensor is indirectly or directly attached to a frame or body shell part of the vehicle roof.

4. The roof module according to claim 1, wherein the reflective surface portion is formed by a polished, vapor-deposited, and/or coated reflection surface.

5. The roof module according to claim 1, wherein the environment sensor and the reflector element are attached to a support component together.

6. The roof module according to claim 1, wherein the environment sensor and the reflector element are disposed on the sensor housing in an encapsulated manner, a sensor housing comprising at least one passage element at which the electromagnetic signals can pass through.

7. The roof module according to claim 6, wherein the reflector element is disposed above the passage element in the vertical direction.

8. The roof module according to claim 7, wherein the environment sensor is at least partially disposed at the same height as the passage element in the vertical direction.

9. The roof module according to claim 1, wherein an adjusting device is associated with the environment sensor and/or the reflector element, the adjusting device allowing the relative position between the environment sensor and the reflector element to be adjusted.

10. The roof module according to claim 1, wherein a cleaning device configured to clean a passage element is associated with the environment sensor.

11. The roof module according to claim 10, wherein the cleaning device comprises a cleaning nozzle configured to discharge a cleaning liquid.

12. The roof module according to claim 1, wherein a heating device configured to heat the reflector element is provided on the roof module.

13. The roof module according to claim 1, wherein the environment sensor is a lidar sensor and/or a radar sensor and/or a camera sensor and/or a multi-camera sensor.

14. A motor vehicle comprising a roof module according to claim 1.

* * * * *